(12) United States Patent
Uchiyama et al.

(10) Patent No.: US 7,150,619 B2
(45) Date of Patent: Dec. 19, 2006

(54) CONTROLLER OF INJECTION MOLDING MACHINE

(75) Inventors: Tatsuhiro Uchiyama, Gotenba (JP); Hiroshi Watanabe, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 1 day.

(21) Appl. No.: 11/109,780

(22) Filed: Apr. 20, 2005

(65) Prior Publication Data

US 2005/0244537 A1    Nov. 3, 2005

(30) Foreign Application Priority Data

Apr. 28, 2004    (JP) ............................. 2004/133591

(51) Int. Cl.
*B29C 45/66* (2006.01)
*B29C 45/76* (2006.01)

(52) U.S. Cl. ...................... 425/149; 425/150; 425/169; 425/593

(58) Field of Classification Search ................ 425/149, 425/150, 169, 170, 171, 190, 593
See application file for complete search history.

(56) References Cited

U.S. PATENT DOCUMENTS

| | | | | |
|---|---|---|---|---|
| 5,045,253 A | * | 9/1991 | Kamiguchi et al. | 425/593 |
| 5,059,365 A | * | 10/1991 | Hertzer et al. | 425/593 |
| 5,946,047 A | * | 8/1999 | Levan | 348/473 |
| 6,157,158 A | * | 12/2000 | Ishikawa | 264/40.5 |
| 6,402,998 B1 | * | 6/2002 | Onishi | 425/593 |
| 6,589,456 B1 | * | 7/2003 | Maru et al. | 425/593 |
| 6,595,766 B1 | * | 7/2003 | Nakamoto | 425/593 |
| 6,695,995 B1 | * | 2/2004 | Suzuki et al. | 425/593 |
| 6,755,635 B1 | * | 6/2004 | Yamaguchi et al. | 425/150 |

FOREIGN PATENT DOCUMENTS

| | | |
|---|---|---|
| DE | 29 49 603 | 3/1981 |
| EP | 0 987 092 | 3/2000 |
| JP | 4-197721 | 7/1991 |
| JP | 04-080269 | 3/1992 |
| JP | 04-086209 | 3/1992 |
| JP | 05-200812 | 8/1993 |
| JP | 07-032435 | 2/1995 |
| JP | 10-119099 | 5/1998 |
| JP | 2000-141012 | 5/2000 |

OTHER PUBLICATIONS

EP Search Report for corresponding application EP 05 25 2584.7-2307 dated Sep. 9, 2005.

* cited by examiner

*Primary Examiner*—James P. Mackey
(74) *Attorney, Agent, or Firm*—Staas & Halsey LLP

(57) ABSTRACT

A crosshead position Cf for obtaining a set mold clamping force is obtained based on a mold touch position Ct obtained in mold clamping process in immediately preceding molding cycle, and a crosshead is allowed to move to the position Cf. During that time, it is determined whether a load La of a servomotor for mold clamping operation which drives a toggle mechanism exceeds a judgment load Ls, and a crosshead position Ca when the load La exceeds the judgment load Ls is stored as a mold touch position. In the next molding cycle, a crosshead position Cf where the set mold clamping force is obtained is obtained based on this stored mold touch position.

4 Claims, 3 Drawing Sheets

CONTROLLER OF INJECTION MOLDING MACHINE

BACKGROUND OF THE INVENTION

1. Field of the Invention

The present invention relates to a controller of an injection molding machine, and more particularly, to a controller which maintains a mold clamping force in a toggle type mold clamping apparatus at a constant level.

2. Description of the Prior Art

In a toggle type mold clamping apparatus in an injection molding machine, a movable mold abuts against a fixed mold and then, the movable mold (or movable platen on which the movable mold is mounted) is moved, a tie bar which connects a fixed platen on which the fixed mold is mounted and a rear platen on which the toggle type mold clamping apparatus is mounted with each other is expanded, thereby generating a mold clamping force. When the mold is replaced, the thickness adjustment for adjusting a position of the rear platen is carried out such that a set mold clamping force can be obtained when a crosshead of the toggle type mold clamping apparatus reaches a predetermined position. After that, if the thickness of the mold is not changed, the set mold clamping force can be obtained by moving the crosshead to a predetermined position. Therefore, the mold clamping force is controlled such that it becomes equal to a target mold clamping force depending upon the crosshead position.

During an automatic operation for continuously molding molded products, it is important to maintain the mold clamping force constantly to stabilize the thicknesses of the molded products and outgassing state. During the automatic operation, however, the molding temperature is changed and the thickness of the mold is varied due to this temperature change. Thus, even if the crosshead is positioned to the initial predetermined position, the mold clamping force can not be maintained at the set mold clamping force.

To solve this problem, Japanese Patent Application Laid-open No. 5-200812 discloses a method for correcting the mold clamping force by providing a mold temperature sensor and by carrying out a mold thickness adjustment in accordance with the mold temperature. According to this method, however, since it is necessary to provide a mold clamping force detector such as a mold temperature sensor or a distortion sensor, costs of the apparatus are increased.

Japanese Patent Application Laid-open No. 10-119099 discloses a method in which a tie bar is provided with a mold clamping force detector such as a distortion sensor, and if a mold clamping force detected by the mold clamping force detector corresponds to a set mold clamping force, a motor which drives a toggle mechanism is stopped, and the mold clamping force is feedback-controlled. According to this method, however, since it is necessary to provide a mold clamping force detector such as a mold temperature sensor or a distortion sensor, costs of the apparatus are increased.

Japanese Patent Application Laid-open No. 2000-141012 discloses that a mold clamping force is detected by a mold clamping force detection sensor comprising a load cell or the like, and if the detected mold clamping force exceeds a set tolerance, a support disk of a mold clamping drive source is moved to adjust a die height. However, there is a problem that if the die height is adjusted, a molding cycle becomes long.

Japanese Patent Application Laid-open No. 7-32435 discloses that a position sensor for detecting a position of a mold clamping housing in an opening and closing direction of a mold is provided, and when carrying out mold thickness adjustment, a moving amount of the mold clamping housing from the mold touch to completion of mold clamping operation is stored as a reference position change amount, and a deviation between the moving amount of the mold clamping housing and the reference position change amount is obtained at the time of actual molding operation, and the mold clamping housing is moved based on this deviation. However, since the die height is adjusted, there is a problem that the molding cycle becomes long.

Japanese Patent Application Laid-open No. 4-86209 discloses that in a mold clamping mechanism for driving a toggle mechanism by a servomotor to move a movable mold, thereby closing the mold, a torque of the servomotor is limited in a mold protection section to drive the servomotor under low pressure, and if the mold protection section is completed, a mold torque is limited to such a degree that the tie bar is not extended, the servomotor is driven for a predetermined and after the predetermined time is elapsed (with the mold touched), the servomotor is driven from a position of a crosshead at that time to a position of the crosshead where the set mold clamping force is generated. According to this method, however, since it is necessary to move the mold with low torque to detect a mold touch position for a given time after the mold protection section is completed, and there is a problem that the molding cycle becomes long. Further, the mold thickness exceeds the initially determined mold protection section completion position due to thermal expansion of the mold, and there is a problem that a precise mold touch position can not be detected.

SUMMARY OF THE INVENTION

According to the present invention, a controller of an injection molding machine having a toggle type mold clamping apparatus, comprises mold touch position detecting means for detecting crosshead position when mold touch is occurred, means for storing the crosshead position detected by the mold touch position detecting means, and means for obtaining a target position of the crosshead in the current mold clamping process based on the crosshead position in the mold touch which is detected and stored in the last mold-closing operation and a mold clamping force which is set. The crosshead is positioned to the target position obtained by the means for obtaining a target position of the crosshead.

The injection molding machine having the toggle type mold clamping apparatus may employ the following modes.

The means for obtaining a target position of the crosshead comprises means for obtaining an extension amount of a tie bar corresponding to a mold clamping force which is set based on a relation between the extension amount of the tie bar and the mold clamping force, and means for storing a relation between a crosshead position and a movable platen position, and a position of a movable platen corresponding to the crosshead position in the mold touch which is detected and stored in the last mold-closing operation is obtained based on the stored relation between the crosshead position and the movable platen position, a crosshead position corresponding to the position of the movable platen obtained by adding to the obtained movable platen position the extension amount of the tie bar is obtained as a target position.

The mold touch position detecting means drives a mold clamping servomotor to move the crosshead forward, and detects the crosshead position when a load of the mold clamping servomotor exceeds a predetermined amount as a mold touch position.

When the obtained target position of the crosshead exceeds a predetermined range, processing to cope with the abnormality is carried out.

Since the injection molding machine having the toggle type mold clamping apparatus of the present invention has the above-described structures, a mold clamping force can be maintained at a constant set mold clamping force even if the mold temperature is varied. Further, since the mold clamping force is controlled based on the mold touch position obtained at the time of the mold clamping process in the previous molding cycle, a special sensor is not required, and the molding cycle time is not increased.

BRIEF DESCRIPTION OF THE DRAWINGS

The above and other objects and features of the present invention will be apparent from the following embodiment explained with reference to the accompanying drawings, wherein.

DETAILED DESCRIPTION OF THE PREFERRED EMBODIMENTS

Figure 1:
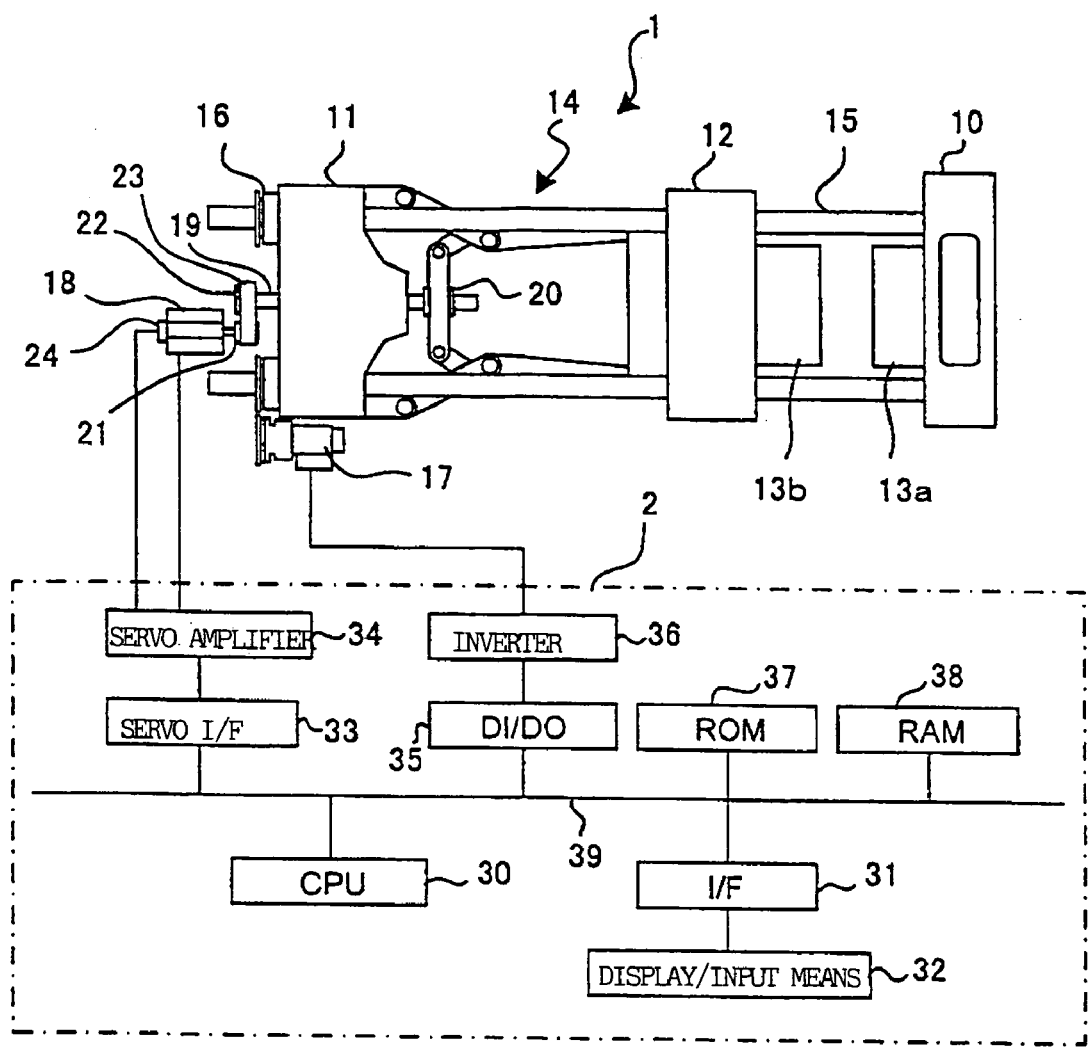
FIG. 1 is an explanatory view of an essential portion of an embodiment of an injection molding machine having a toggle type mold clamping apparatus of the present invention.

FIG. 1 is an explanatory view of an embodiment of the present invention. In FIG. 1, a reference numeral 1 represents a toggle type mold clamping apparatus, and a reference numeral 2 represents a controller of an injection molding machine having the toggle type mold clamping apparatus 1. A fixed platen 10 and a rear platen 11 are connected to each other through a plurality of tie bars 15. A movable platen 12 is disposed between the fixed platen 10 and the rear platen 11 such that the movable platen 12 is guided by the tie bar 15. A fixed mold 13a is detachably mounted on the fixed platen 10, and a movable mold 13b is detachably mounted on the movable platen 12.

A toggle mechanism 14 is disposed between the rear platen 11 and the movable platen 12. The rear platen 11 is provided with a mold clamping servomotor 18 for driving the toggle mechanism 14 and a ball screw 19.

The ball screw 19 is mounted on the rear platen 11 such that the ball screw 19 can rotate but can not move in the axial direction. A follower pulley 22 is mounted on a rear end of the screw 19 (or an end on the side opposite the movable platen 12 with respect to the rear platen 11). A drive pulley 21 is provided on an output shaft of a mold clamping servomotor 18 provided on the rear platen 11. A timing belt 23 is looped between the drive pulley 21 and the follower pulley 22 so that the ball screw 19 is rotated by the mold clamping servomotor 18. A nut fixed to the crosshead 20 of the toggle mechanism 14 is threadedly engaged with a tip end of the ball screw 19. If the ball screw 19 is rotated, the nut and the crosshead 20 are moved in the lateral direction in the drawing, the toggle mechanism 14 is expanded or contracted, the movable platen 12 is moved forward and backward (in the lateral direction in the drawing) in the drawing, thereby carrying out a mold-closing operation, a mold clamping operation and a mold-opening operation. A reference numeral 24 represents a position/speed detector for detecting position/speed of the mold clamping servomotor 18.

A nut which is threadedly engaged with a screw formed on the tie bar 15 and a rotation member 16 comprising a gear are mounted on a rear end of the rear platen 11 (an end opposite the movable platen 12 with respect to the rear platen 11) such that the nut and the rotation member 16 can rotate but can not move in the axial direction. A mold-thickness adjusting motor 17 is mounted on the rear platen 11. A gear provided on an output shaft of the mold-thickness adjusting motor 17 and a gear of the rotation member 16 provided on each tie bar 15 are connected to each other through a gear transmitting mechanism (not shown)

The rotation member 16 is rotated by driving the mold-thickness adjusting motor 17, and the rear platen 11 moves forward and backward along the tie bar 15, and it is adjusted such that a set mold clamping force can be obtained in accordance with the thickness of the mold.

The controller 2 includes a processor 30 for controlling an injection molding machine. The controller 2 also includes a ROM 37 for storing a system program, a RAM 38 for temporarily storing data and for storing various control programs, a servo interface 33, an input/output circuit 35, and an interface 31 of the display/input means 32, and these elements are connected to the processor 30 through buses 39. The mold clamping servomotor 18 for driving the toggle type mold clamping apparatus 1 is connected to the servo interface 33 through the servo amplifier 34. Similarly, various servomotors of the injection molding machine are also connected to the controller 2, but since they do not directly relate to the present invention, they are not illustrated in FIG. 1.

An inverter 36 for driving the mold-thickness adjusting motor 17 is connected to the input/output circuit 35. The display/input means 32 connected to the interface 31 comprises a liquid crystal display, a keyboard and the like.

With the above configuration, the processor 30 of the controller 2 first drives the mold-thickness adjusting motor 17 to move the rear platen 11 forward or backward, thereby adjusting the mold clamping force. Then, a continuous molding process is started. In the mold clamping process, a program of the mold clamping operation is carried out, and a moving command is outputted to the servo interface 33. The servo interface 33 carries out position loop control processing and speed loop control processing based on the moving command and feedback signals of the position and speed from the position/speed detector 24 mounted on the mold clamping servomotor 18, and controls the operation of the mold clamping servomotor 18. The crosshead 20 of the toggle mechanism 14 is moved by the operation of the mold clamping servomotor 18, the movable platen 12 is moved, and the mold-closing operation, the mold clamping operation and the mold-opening operation are carried out.

As the molding operations are carried out continuously, the temperature of the mold is varied. If the temperature of the mold is varied, the thickness of the mold is varied, and the touch position of the mold is also varied. Thus, in this embodiment, the mold touch position is detected, and this value is defined as a mold touch position in a next mold clamping process, a crosshead position where the set mold clamping force can be obtained is obtained from the mold touch position, and the mold is positioned to this position so that even if the mold temperature is varied, more precise set mold clamping force can be obtained.

In the toggle type mold clamping apparatus 1, the tie bar 15 extends and its reaction force generates the mold clamping force. The extension of the tie bar 15 is in proportional to the generated mold clamping force. The extension of the tie bar 15 is equal to the moving amount of the movable platen (or moving amount of the movable mold) from the touch position where the movable mold 13b comes into contact with the fixed mold 13a and closes. Thus, if the movable platen 12 is moved forward (toward the fixed platen) by the amount of extension of the tie bar 15 corresponding to the set mold clamping force from the mold-touch position, the set mold clamping force can be obtained.

Figure 2:
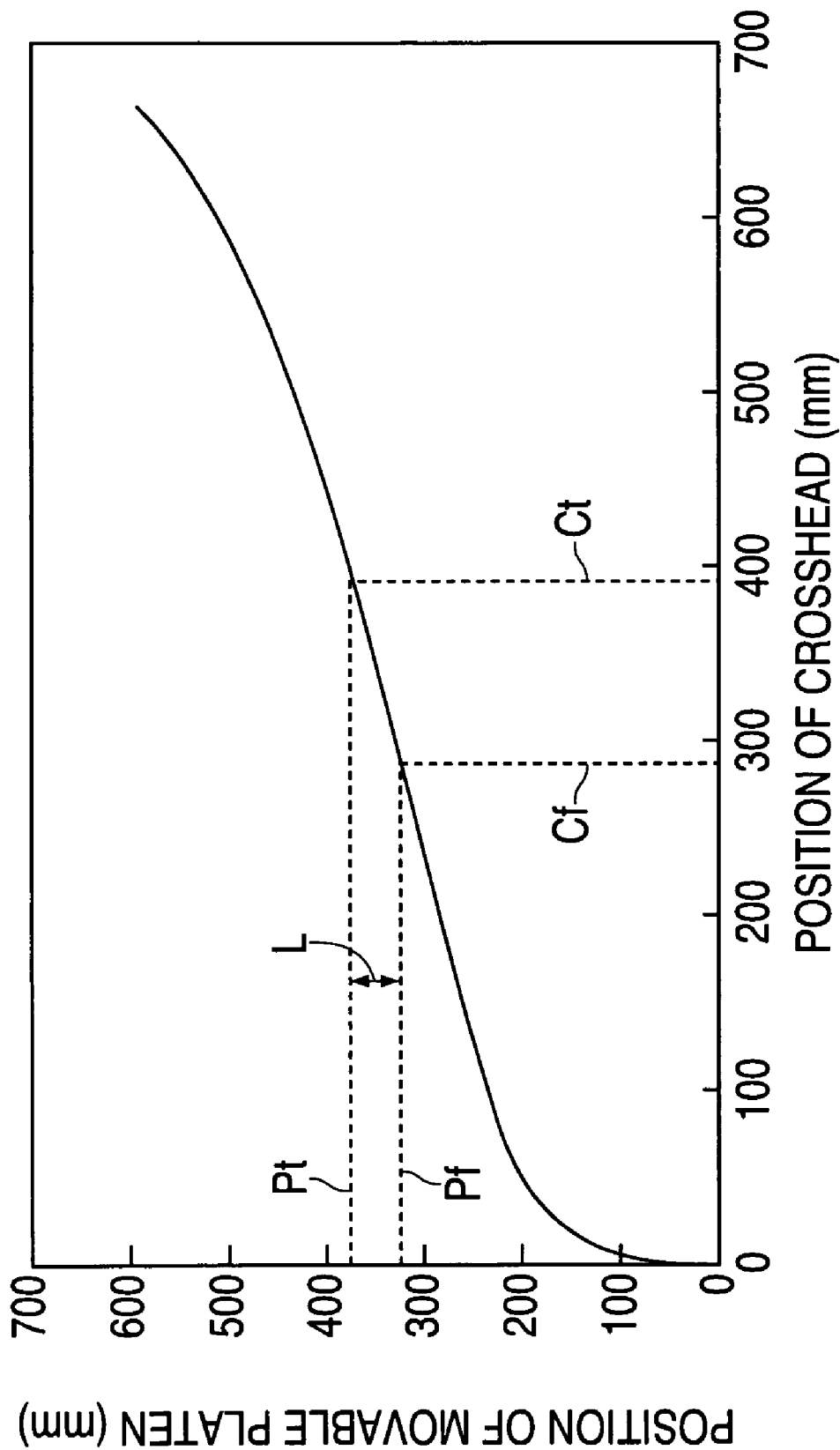
FIG. 2 is a graph showing a positional relation between a crosshead and a movable platen in the injection molding machine shown in FIG. 1.

FIG. 2 is a graph showing the relation between the position of the crosshead 20 and the position of the movable platen. In FIG. 2, the most forward position of the movable platen (position where the link of the toggle mechanism 14 extends and the movable platen 12 assumes the most rightward position in FIG. 1) is defined as an original point "0" of the movable platen 12, and the position of the crosshead 20 at that time is defined as an original point "0" of the crosshead. As a result, in the mold clamping process, the movable platen 12 moves downward from upward in FIG. 2, and the crosshead 20 moves from right to left. Since the crosshead position and the position detected by the position/speed detector provided on the mold clamping servomotor 18 are proportional to each other, the position detected by the position/speed detector is defined as the position of the crosshead 20.

For example, as shown in FIG. 2, assume that the mold touch is detected when the crosshead 20 assumes the position Ct. A position Pt of the movable platen 12 corresponding to the mold touch position Ct can be obtained from the graph shown in FIG. 2. A movable platen position Pf corresponding to the set mold clamping force is obtained by adding an extension amount L of the tie bar 15 corresponding to the set mold clamping force to the position Pt of the movable platen 12 (in this case, since moving direction is minus direction in coordinate systems, a negative moving amount is added). The position Cf of the crosshead 20 corresponding to the movable platen position Pf is obtained from the graph, this crosshead position Cf is defined as a target crosshead position Cf where the set mold clamping force can be obtained, and if the mold clamping servomotor 18 is positioned to the target crosshead position Cf, the set mold clamping force can be obtained.

In this manner, if the mold touch position can be obtained, it is possible to obtain the position of the crosshead 20 where the set mold clamping force can be obtained from the graph shown in FIG. 2. The relation between the crosshead position and the movable platen position shown in FIG. 2 can be obtained by a mathematical expression using a link size of the toggle or the like, or by an approximate expression as described in Japanese Patent Application Laid-open No. 62-71620 or Japanese Patent Application Laid-open No. 2000-6211, or by storing the graph as shown in FIG. 2 as data and by interpolation for values of the stored data. Various methods can be employed. Since the mold clamping force and the extension of the tie bar 15 are proportional to each other, they can be obtained by experiments.

A crosshead position in the current mold clamping process for obtaining the set mold clamping force is obtained based on a crosshead position of a detected mold touch position of the last mold clamping process, and it is controlled such that the mold clamping servomotor 18 is positioned to this position so that a precise set mold clamping force is obtained without being affected by the temperature variation of the mold.

Figure 3:
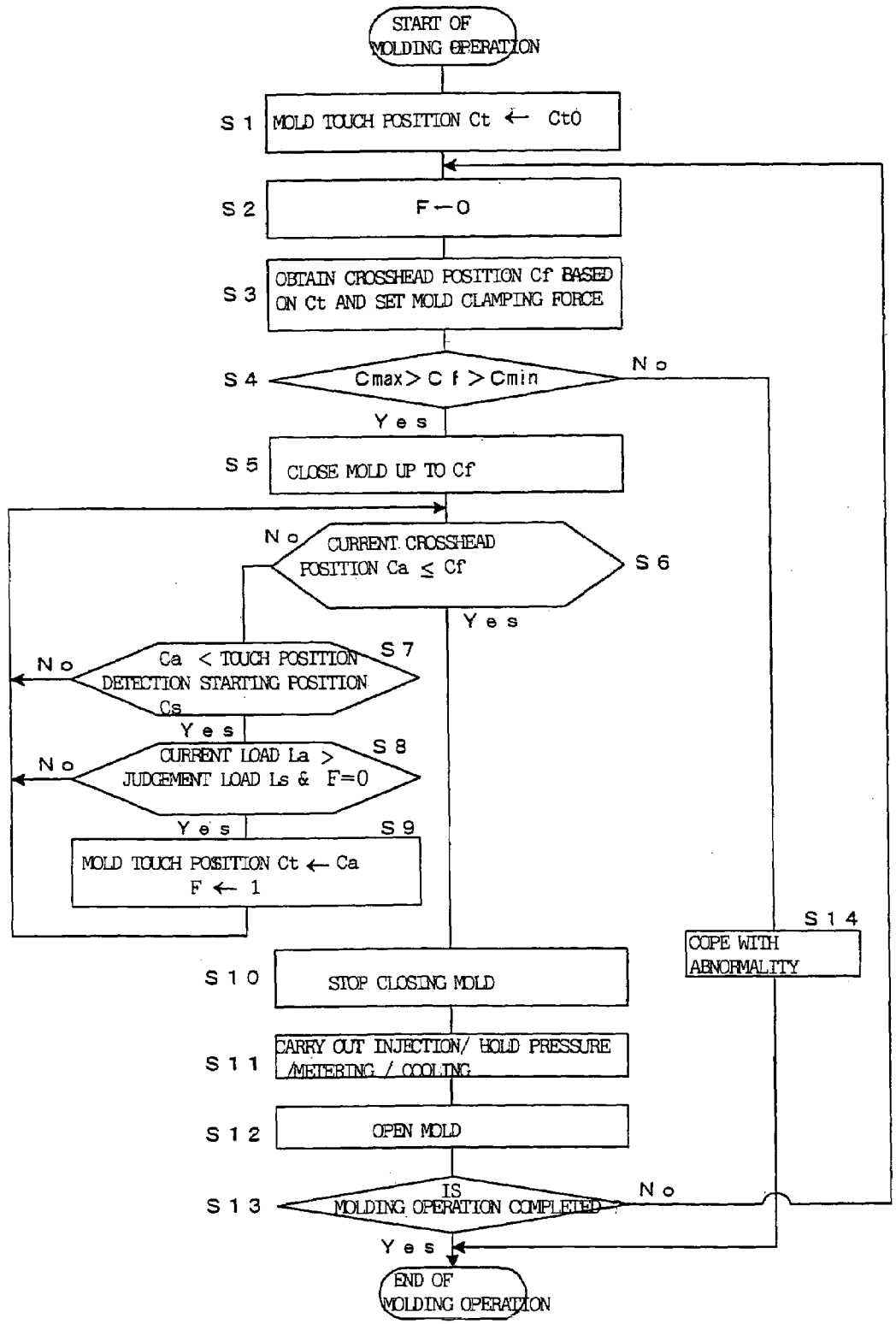
FIG. 3 is a flowchart of processing of a continuous molding operation carried out by a controller shown in FIG. 1.

FIG. 3 is a flowchart of continuous molding process carried out by the processor 30 of the embodiment, and operations for obtaining the set mold clamping force are mainly described.

If a continuous molding command is inputted, the processor 30 first sets an initial value Ct0 of a mold touch position in a register which stores the mold touch position Ct (position of the crosshead) (step S1), and sets a flag F indicative of detection of the mold touch position to "0" (step S2). Then, based on the mold touch position Ct which is set in the register, the movable platen position is obtained using the approximate expression or data of the graph shown in FIG. 2. Then, the movable platen position to which the extension amount of the tie bar 15 corresponding to the set mold clamping force is added is obtained, and the crosshead position Cf corresponding to the movable platen position is obtained using the data of the graph shown in FIG. 2 or the approximate expression. This crosshead position Cf is defined as a target crosshead Cf of the mold clamping process in the current molding cycle (step S3).

Next, it is determined whether the target crosshead Cf is greater than a minimum value Cmin and smaller than a maximum value Cmax of the set crosshead position (step S4), and if the target crosshead Cf is not between the minimum value Cmin and the maximum value Cmax, it is determined that this is abnormal, and a processing to cope with the abnormality is carried out (step S14), and the molding operation is stopped.

If the target crosshead position Cf is greater than the minimum value Cmin and smaller than the maximum value Cmax of the crosshead position, a starting command of the mold-closing operation up to the target crosshead position Cf is outputted to the servo amplifier 34 through the servo interface 33, and the mold clamping servomotor 18 is driven (step S5). The crosshead 20 and the movable platen 12 move forward (rightward in FIG. 1) by the operation of the mold clamping servomotor 18. The crosshead position Ca detected by the position/speed detector 24 is read, and it is determined whether the crosshead position Ca is equal to or smaller than the target crosshead position Cf (step S6). Since the most forward position of the crosshead 20 (most right position in FIG. 1) is defined as the original point "0", the crosshead position Ca changes from a great value to a small value by the forward movement of the crosshead 20.

If the crosshead position Ca has not yet reached the target crosshead position Cf, it is determined whether the crosshead position Ca has reached the mold touch position detection starting position Cs (step S7), and the processing in steps S6 and S7 is repeatedly carried out. The mold protection section may be provided between this position and the mold touch position detection starting position Cs and the mold protecting process may be carried out, but since this processing does not relate to the present invention directly, this is omitted.

If the current crosshead position Ca becomes smaller than the mold touch position detection starting position Cs, a load La applied to the mold clamping servomotor 18 is detected, the load La is compared with a judgment load Ls which is set for the detection of mold touch, and it is determined whether or not the flag F is "0" (step S8). The load La applied to the mold clamping servomotor 18 may be detected by current flowing through the mold clamping servomotor 18, or by incorporating a known disturbance estimating observer into a control circuit of the mold clamping servomotor 18 and by using this disturbance estimating observer.

If the current load La is not greater than the judgment load Ls, processing in steps S6 to S8 is repeatedly carried out. If the movable mold 13b comes into contact with the fixed mold 13a and touches the mold, the load La applied to the mold clamping servomotor 18 is increased, the load La exceeds the judgment load Ls, and if the flag F (which is initially set to "0" in step S2) is "0", the procedure is proceeded to step S9, the crosshead position Ca at that time is stored in the register as the mold touch position Ct, it is assumed that the mold touch is detected, the flag F is set to "1" (step S9), and the procedure is returned to step S6. Since the flag F is set to "1", the process in steps S6 to S8 is repeatedly carried out until the current crosshead position Ca becomes equal to or smaller than the target crosshead position Cf.

If the current crosshead position Ca becomes equal to or smaller than the target crosshead position Cf, the mold clamping servomotor 18 is positioned to that position, the mold-closing operation is stopped, and the mold is maintained in the mold clamping operation state (step S10). In this state, the set mold clamping force is obtained.

Like the conventional technique, injection step, hold pressure step, metering step and cooling step are carried but (step S1), the mold-opening operation is carried out (step S12), and if the molding completion command is not inputted, the procedure is returned to step S2, and the next molding cycle is started. At that time, the crosshead position Cf corresponding to the set mold clamping force obtained in step S3 is obtained based on the mold touch position Ct detected at the time of the mold clamping process in the previous molding cycle set in step S9.

The invention claimed is:

1. A controller of an injection molding machine having a toggle type mold clamping apparatus, comprising:
   mold touch position detecting means for detecting crosshead position when mold touch occurs;
   means for storing the crosshead position detected by the mold touch position detecting means; and
   means for obtaining a target position of the crosshead in the current mold clamping process based on the crosshead position at mold touch which is detected and stored in the last mold-closing operation and a set mold clamping force,
   wherein the crosshead is positioned to the target position obtained by said means for obtaining a target position of the crosshead.

2. The controller of an injection molding machine according to claim 1, wherein
   the means for obtaining a target position of the crosshead comprises
   means for obtaining an extension amount of a tie bar corresponding to a mold clamping force which is set based on a relation between the extension amount of the tie bar and the mold clamping force, and
   means for storing a relation between a crosshead position and a movable platen position, wherein
   a position of a movable platen corresponding to the crosshead position in the mold touch which is detected and stored in the last mold-closing operation is obtained based on the stored relation between the crosshead position and the movable platen position,
   a crosshead position corresponding to the position of the movable platen which is obtained by adding to the obtained movable platen position the extension amount of the tie bar is obtained as a target position.

3. The controller of an injection molding machine according to claim 1 or 2, wherein the mold touch position detecting means drives a mold clamping servomotor to move the crosshead forward, and detects the crosshead position when a load of the mold clamping servomotor exceeds a predetermined amount as a mold touch position.

4. The controller of an injection molding machine according to claim 1 or 2, wherein when the obtained target position of the crosshead exceeds a predetermined range, a determination is made by the controller that abnormality has occurred.

* * * * *

UNITED STATES PATENT AND TRADEMARK OFFICE
CERTIFICATE OF CORRECTION

| | |
|---|---|
| PATENT NO. | : 7,150,619 B2 |
| APPLICATION NO. | : 11/109780 |
| DATED | : December 19, 2006 |
| INVENTOR(S) | : Tatsuhiro Uchiyama et al. |

Page 1 of 1

It is certified that error appears in the above-identified patent and that said Letters Patent is hereby corrected as shown below:

Column 2, Line 20, after "predetermined" insert --time--. (1st occurrence)

Column 4, Line 17, after ")" insert --.--.

Column 7, Line 26, change "but" to --out--.

Column 7, Line 27, change "S1)," to --S11),--.

Signed and Sealed this

Tenth Day of April, 2007

JON W. DUDAS
*Director of the United States Patent and Trademark Office*